C. L. HEYERMANS.
SUPPORTING MEANS FOR ENGINES.
APPLICATION FILED JULY 20, 1917.
1,285,170.
Patented Nov. 19, 1918.
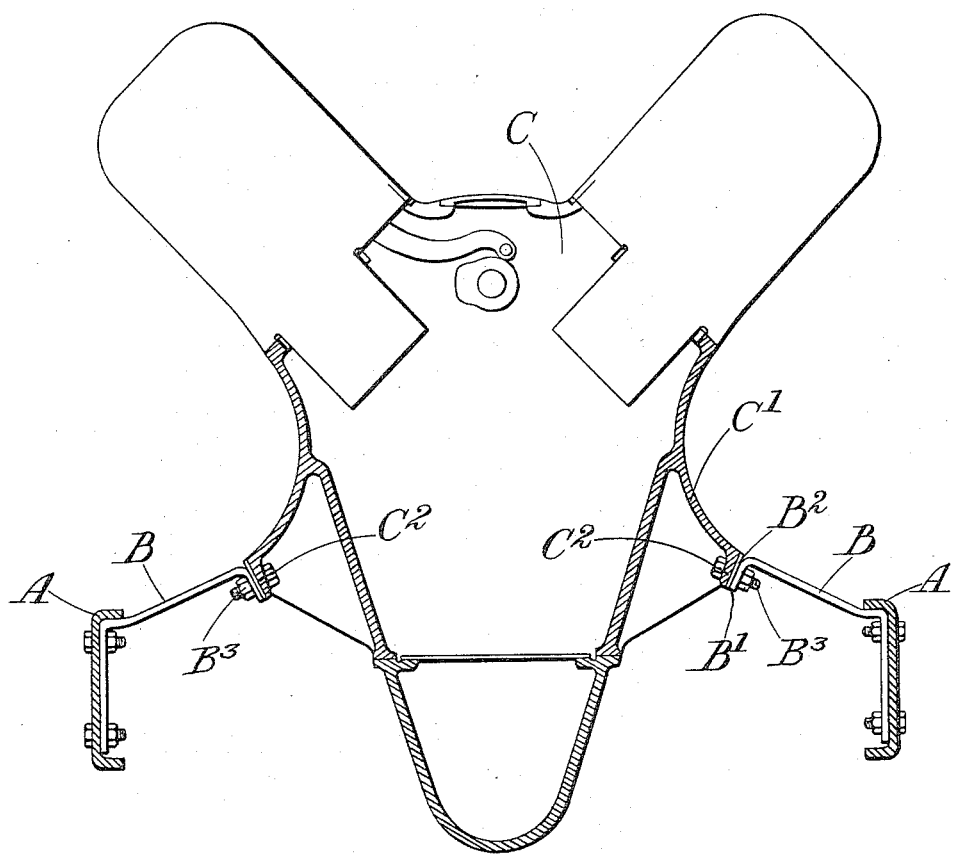
Witnesses
Inventor
Charles L. Heyermans

UNITED STATES PATENT OFFICE.

CHARLES LOUIS HEYERMANS, OF LONDON, ENGLAND, ASSIGNOR OF ONE-HALF TO CECIL HENRY ARTHUR EDYE, OF LONDON, ENGLAND.

SUPPORTING MEANS FOR ENGINES.

1,285,170.      Specification of Letters Patent.      Patented Nov. 19, 1918.

Application filed July 20, 1917. Serial No. 181,752.

*To all whom it may concern:*

Be it known that I, CHARLES LOUIS HEYERMANS, a subject of the King of Belgium, residing in London, England, have invented certain new and useful Improvements in Supporting Means for Engines, of which the following is a specification.

This invention is for improvements in or relating to supporting means for engines and has for its object to provide means for this purpose which are simple in construction and enable the engine to be quickly and accurately brought into position relatively to the chassis or other base and to be efficiently held when secured in the intended position.

According to this invention, the supporting means for an engine comprise a carriage which provides lateral seating faces for the engine, which faces are toward each other and are respectively parallel to the sides of a dihedral angle whose apex lies centrally between them and below the level of the said faces, and the engine is provided with laterally-projecting lugs having seating faces angled to lie flush against those on the carriage. It will be seen that the seating faces on the carriage thus constitute a kind of trough (which, however, has no bottom) wherein the engine sits.

Preferably the seating faces of the carriage are formed at the ends of brackets (for example two-armed brackets whereof one arm is shaped to lie against the side of one of the longitudinal members of the chassis, and the other arm projects inwardly and upwardly from the same) which project inwardly and upwardly from the base, each bracket having at its free end a seating face formed as a lip to the bracket and which may be made integral therewith or may be welded thereto but is machined to the proper angle.

The accompanying drawing shows diagrammatically one method of carrying out this invention as applied to the chassis of a motor vehicle.

The longitudinal members of the chassis are shown at A, and bolted on the inner side of each longitudinal member is a two-armed bracket B whereof one arm is shaped to lie flush against the inner side of the frame-member and the other arm is bent upward and inwardly. At the free end the arm is bent down to provide a lip $B^1$ and on this is secured a plate of metal $B^2$. The plate $B^2$ is preferably welded on to the lip $B^1$ and is machined to provide a flat seating surface for the engine. The seating surface of one bracket B faces the seating surface of the other bracket and they are parallel one to another as viewed in plan, but slope from the outer edge downward to a point midway between them and at a lower level, the two surfaces thus conforming to the sides of a dihedral angle whose apex is situated midway between them but at a lower level.

The engine, indicated at C, is provided with lateral outwardly-projecting lugs $C^1$ which are machined at $C^2$ to provide seating faces corresponding in shape to those constituted by the plates $B^2$ on the brackets B.

It will be seen that with this arrangement the engine has only to be dropped in place into the trough-like carrier afforded by the members A, brackets B and sloped seating plates $B^2$ (the so-called trough of course having no bottom), and provided the seating faces are properly formed and the coöperating faces of the lugs likewise properly formed, the engine will immediately be properly alined laterally and has only to be moved endwise to bring it into alinement longitudinally of the car; further, the seating afforded it is of such character that the weight of the engine tends to keep it in position so that when fastened by bolts $B^3$ which extend through the plates $B^2$ and lips $B^1$ and also through corresponding lips provided on the lugs $C^1$ of the engine, the engine will be efficiently secured in place.

The brackets B being made of plate metal can easily be bent to approximately the correct angle prior to the faces of the plate $B^2$ being machined to the correct angle. Preferably the lugs $C^1$ are curved and the brackets are made to continue this curve as shown, so that the construction is graceful and symmetrical in design.

The invention is not restricted to the securing of engines to the chassis of motor vehicles, but can be applied to any base which with the brackets B or their equivalent is to constitute the carrier for the engine.

What I claim as my invention and desire to secure by Letters Patent is:—

1. Supporting means for an engine comprising a carriage which provides lateral seating faces for the engine, which faces are toward each other and are respectively parallel to the sides of a dihedral angle whose apex lies centrally between them and below the level of the said faces, and the engine being provided with laterally-projecting lugs having seating faces inclined to lie flush against those on the carriage, substantially as described.

2. Supporting means for an engine, comprising a base, opposed brackets which project inwardly and upwardly from the base, each bracket having at its free end a seating face formed as a lip to the bracket the seating faces being toward each other and are respectively parallel to the sides of a dihedral angle whose apex lies centrally between them and below the level of the said faces, and an engine having laterally-projecting lugs provided with seating faces inclined to lie flush against those on the said brackets, substantially as and for the purpose set forth.

3. Supporting means for an engine, comprising two longitudinal members of a chassis, opposed brackets which project inwardly and upwardly one from each of these members, each bracket having at its free end a seating face formed as a lip to the bracket the seating faces being toward each other and are respectively parallel to the sides of a dihedral angle whose apex lies centrally between them and below the level of the said faces, and an engine having laterally-projecting lugs provided with seating faces inclined to lie flush against those on the said brackets, substantially as and for the purpose set forth.

4. Supporting means for an engine, comprising two longitudinal members of a chassis, opposed brackets which project inwardly and upwardly one from each of these members, each bracket having two arms, one arm of which is shaped to lie against the side of the longitudinal member by which it is carried and the other projecting inwardly and upwardly and having a seating face formed as a lip at the end of it, the seating faces being toward each other and are respectively parallel to the sides of a dihedral angle whose apex lies centrally between them and below the level of the said faces, and an engine having laterally-projecting lugs provided with seating faces inclined to lie flush against those on the said brackets, substantially as and for the purpose set forth.

5. Supporting means for an engine, comprising two longitudinal members of a chassis, opposed brackets which project inwardly and upwardly one from each of these members, a plate welded to the free end of each bracket and machined to provide a seating face, the seating faces being toward each other and are respectively parallel to the sides of a dihedral angle whose apex lies centrally between them and below the level of the said faces, and an engine having laterally-projecting lugs provided with seating faces inclined to lie flush against those on the said brackets, substantially as and for the purpose set forth.

6. Supporting means for an engine, comprising two longitudinal members of a chassis, opposed brackets formed of plate metal so that they can be bent to bring them to approximately the required positions and which project inwardly and upwardly one from each of these members, each bracket having at its free end a seating face formed as a lip to the bracket, the seating faces being toward each other and respectively parallel to the sides of a dihedral angle whose apex lies centrally between them and below the level of the said faces, and an engine having laterally-projecting lugs provided with seating faces inclined to lie flush against those on the said brackets, substantially as and for the purpose set forth.

7. Supporting means for an engine, comprising two longitudinal members of a chassis, opposed brackets which project inwardly and upwardly one from each of these members, each bracket having at its free end a seating face formed as a lip to the bracket, the seating faces being toward each other and respectively parallel to the sides of a dihedral angle whose apex lies centrally between them and below the level of the said faces, and an engine having laterally-projecting lugs provided with seating faces inclined to lie flush against those on the said brackets, the upper outer face of the lugs of the engine being curved outward to meet the supporting brackets whose shape is such as to continue the line of curvature of the lugs and thus provide a construction which is graceful and symmetrical in design, substantially as set forth.

8. Supporting means for an engine, comprising a base, opposed brackets which project inwardly and upwardly from the base, each bracket having at its free end a seating face formed as a lip to the bracket, the seating faces being toward each other and respectively parallel to the sides of a dihedral angle whose apex lies centrally between them and below the level of the said faces, and an engine having laterally-projecting lugs provided with seating faces inclined to lie flush against those on the said brackets, and lips which lie opposite the lips formed by the seating faces on the brackets, and bolts which extend through the opposed lips of the brackets and lugs and grip them together, substantially as and for the purpose set forth.

9. Supporting means for an engine having opposed inclined seating surfaces, said surfaces being respectively parallel to the sides of a dihedral angle and arranged to form sliding seats to wedge the engine into place on the supporting means, substantially as described.

10. Engine supporting means having oppositely disposed seating surfaces, said surfaces being downwardly and inwardly inclined and arranged to form sliding seats to wedge the engine into place on the supporting means, substantially as described.

In testimony whereof I have signed my name to this specification.

CHARLES LOUIS HEYERMANS.